United States Patent
Hoofman et al.

(10) Patent No.: US 8,872,290 B2
(45) Date of Patent: Oct. 28, 2014

(54) SENSING ENVIRONMENTAL PARAMETER THROUGH STRESS INDUCED IN IC

(75) Inventors: Romano Hoofman, Geel (BE); Remco Henricus Wilhelmus Pijnenbrug, Hoogeloon (NL); Youri Victorovitch Ponomarev, Leuven (BE)

(73) Assignee: NXP B.V., Eindhoven (NL)

( * ) Notice: Subject to any disclaimer, the term of this patent is extended or adjusted under 35 U.S.C. 154(b) by 328 days.

(21) Appl. No.: 13/057,075

(22) PCT Filed: Jul. 30, 2009

(86) PCT No.: PCT/IB2009/053321
§ 371 (c)(1),
(2), (4) Date: Feb. 1, 2011

(87) PCT Pub. No.: WO2010/013214
PCT Pub. Date: Feb. 4, 2010

(65) Prior Publication Data
US 2011/0127627 A1  Jun. 2, 2011

(30) Foreign Application Priority Data

Aug. 1, 2008  (EP) .................................. 08104945

(51) Int. Cl.
*H04L 23/00* (2006.01)
*G01D 5/18* (2006.01)

(52) U.S. Cl.
CPC .......................................... *G01D 5/18* (2013.01)
USPC .................................... 257/418; 257/E29.324

(58) Field of Classification Search
CPC .. H01L 41/081; H01L 41/083; H01L 41/0805
See application file for complete search history.

(56) References Cited

U.S. PATENT DOCUMENTS

| 5,015,843 | A | 5/1991 | Seitz et al. |
|---|---|---|---|
| 6,480,730 | B2 | 11/2002 | Darrow et al. |
| 6,940,408 | B2 * | 9/2005 | Ferguson et al. ........... 340/572.7 |
| 7,253,488 | B2 | 8/2007 | Zhan et al. |
| 7,304,098 | B2 | 12/2007 | Li et al. |
| 8,749,013 | B2 * | 6/2014 | Benzel et al. ................. 257/467 |
| 2003/0038328 | A1 * | 2/2003 | Ishio .............................. 257/419 |
| 2005/0020094 | A1 | 1/2005 | Forbes et al. |
| 2005/0130360 | A1 | 6/2005 | Zhan et al. |

(Continued)

FOREIGN PATENT DOCUMENTS

| EP | 1191332 A1 | 3/2002 |
|---|---|---|
| JP | 11-195792 A | 7/1999 |
| JP | 2007-250664 A | 9/2007 |
| WO | 2007/091299 A1 | 8/2007 |

OTHER PUBLICATIONS

International Search Report for Patent Appln. No. PCT/IB2009/053321 (Nov. 23, 2009).

(Continued)

*Primary Examiner* — Benjamin Sandvik

(57) ABSTRACT

A sensor is provided for sensing a value of a physical parameter characteristic of the sensor's environment. The sensor is implemented in semiconductor technology. A behavior of the sensor's electronic circuitry is affected by stress. The stress is induced by a film covering the circuitry or only part thereof. The stress is caused by the film's material, whose dimensions depend on a value of the parameter. This dependence is different from the 5 dependence of the circuitry's substrate on the same parameter.

16 Claims, 5 Drawing Sheets

(56) References Cited

U.S. PATENT DOCUMENTS

| | | | |
|---|---|---|---|
| 2006/0060003 A1* | 3/2006 | Thaysen | 73/862.639 |
| 2006/0076855 A1* | 4/2006 | Eriksen et al. | 310/344 |
| 2006/0160314 A1 | 7/2006 | Arghavani | |
| 2006/0269693 A1 | 11/2006 | Balseanu et al. | |
| 2006/0270238 A1 | 11/2006 | Izumi et al. | |
| 2007/0023851 A1* | 2/2007 | Hartzell et al. | 257/414 |
| 2007/0108384 A1 | 5/2007 | Mueller et al. | |
| 2007/0108532 A1 | 5/2007 | Harafuji et al. | |
| 2008/0026503 A1 | 1/2008 | Ryan | |
| 2009/0066345 A1* | 3/2009 | Klauk et al. | 324/661 |
| 2009/0293618 A1* | 12/2009 | Tamura | 73/514.33 |

OTHER PUBLICATIONS

"Strained Silicon: Essential for 45 nm", Laura Peters, Semiconductor International, Mar. 1, 2007.

Ghani, T. et al. "A 90 nm High Volume Manufacturing Logic Technology Featuring Novel 45 nm Gate Length Strained Silicon CMOS Transistors", Intel Corporation, 17 pgs, retrieved from the internet Jun. 10, 2014: http://www.ece.neu.edu/edsnu/mcgruer/class/eceu606/Intel-Strained-Si-foils-IEDM-1203.pdf (2003).

Thompson, S. E. et al. "Key Differences for Process-Induced Uniaxial vs. Substrate-induced Biaxial Stressed Si and Ge Channel MOSETs", IEEE International Electron Devices Meeting, pp. 221-224 (2004).

Altet, J. et al. "Thermal Testing of Integrated Circuits", Kluwer Academic Publishers, pp. 161-178 (2002).

Pourjavadi, A. et al. "Superabsorbency, pH-Sensitivity and Swelling Kinetics of Partially Hydrolyzed Chitosan-g-poly (Acrylamide) Hydrogels", Turkish Journal Chemistry, pp. 595-608 (2006).

Kim, J. S. et al. "Biaxial Stress Analysis in Laminated Polymer Films on Silicon Substrates for MCM-D Application", Journal of the Korean Physical Society, vol. 33, pp. s142-s146 (Nov. 1998).

Kim, J. S. et al "Thermo-Mechanical Stresses in Laminated Polymer Films on Silicon Substrates", 1998 International Conference on Multichip Modules and High Density Packaging, pp. 449-453 (Apr. 1998).

Bartil, T. et al. "Swelling behavior and release properties of pH-sensitive hydrogels based on methacrylic derivatives", Acta Pharm. 57, pp. 301-314 (2007).

Ceylan, D. et al. "Swelling-Deswelling Kinetics of Ionic Poly(acrylamide) Hydrogels and Cryogels", Journal of Applied Polymer Science, vol. 99, No. 1, pp. 319-325 (Jan. 2006).

Zrinyi, M. et al. "Direct Observation of Discrete and Reversible Shape Transition in Magnetic Field Sensitive Polymer Gels", Technical University of Budapet, Hungary, 6 pgs retrieved from the internet at: http://www.kfki.hu/~cheminfo/hun/olvaso/zrinyi/polymgel.html (1997).

Zrinyi, M. et al. "Ferrogel: a new magneto-controlled elastic medium", Polymer Gels and Networks, vol. 5, No. 5, pp. 415-427 (1997).

Szabo, D. et al. "Studies on nonhomogeneous deformation in magnetic field sensitive gels" A C H—Models in Chemistry 134 (2-3), pp. 155-167 (1997).

Basi, L. et al. "Ferrogel: Magneses Terre Erzekeny Rugalmas Anyag", Magyar Kemiai Folyoirat, 103, pp. 401-410 (1997).

Zrinyi, M. "Magnetic-field-sensitive Polymer Gels", Trends in Polymer Science, vol. 5, No. 9, pp. 280-285 (1997).

Zrinyi, M et al. "Magnetic Field Sensitive Polymeric Actuators", Polymer Sensors and Actuators, Osada, Y. et al. pp. 385-408 (2000).

Zrinyi, M. et el., "Comparative Studies of Electric—and Magnetic Field Sensitive Polymer Gels", Proceedings of SPIE—Smart Structures and Materials 1999: Electroactive Polymer Actuators and Devices, pp. 406-413 (Mar. 1999).

Zrinyi, M. et al. "Electric and Magnetic Field-Sensitive Smart Polymer Gels", Polymer Gels and Networks, pp. 309-355 (2002).

Zrinyi, M. "Intelligent polymer gels controlled by magnetic fields", Colloid and Polymer Science, vol. 278, No. 2, pp. 98-103 (Feb. 2000).

Xulu, P. M. et al. "Preparation and Responsive Properties of Magnetically Soft Poly(N-isopropylacrylamide) Gels", Macromolecules, vol. 33, No. 5, pp. 1716-1719 (2000).

Thanachayanont, A. et al. "Low-Voltage Current-Sensing CMOS Interface Circuit for Piezo-Resistive Pressure Sensor", ETRI Journal, vol. 29, No. 1, pp. 70-78 (Feb. 2007).

Athan, S. P. et al. "A Novel Built-in Current Sensor for IDDQ Testing of Deep Submicron CMOS ICs", Proceeding of 14th VLSI Test Symposium, pp. 118-123 (Apr. 1996).

Kim, H. et al. "A Practical Built-In Current Sensor for IDDQ Testing", IEEE Proceedings International Test Conference, pp. 405-414 (2001).

Forghani-zadeh, H. P. et al. "Current-sensing techniques for DC-DC converters", The 2002 45th Midwest Symposium Circuits and Systems, vol. 2 pp. II-577-II-580 (Aug. 2002).

\* cited by examiner

SENSING ENVIRONMENTAL PARAMETER THROUGH STRESS INDUCED IN IC

FIELD OF THE INVENTION

The invention relates to a device comprising a sensor for sensing a value of a physical parameter indicative of an environment of the sensor. The invention also comprises a method of manufacturing such device.

BACKGROUND OF THE INVENTION

The introduction of strain in the channel of a field effect transistor (FET), e.g., metal-insulator-semiconductor FET (MISFET) such as a metal-oxide-semiconductor FET (MOSFET), has been used as a way to boost integrated circuit performance, e.g., drive currents ($I_{dsat}$).

If the length of the channel is reduced, the threshold voltage turns out to become less well-defined and sub-threshold leakage currents occur. In order to inhibit these effects, the dopant concentration of the channel region is made to increase, and the source and drain are formed in a shallow layer. However, if the dopant concentration of the channel region increases, the carrier mobility decreases as a result of an increased scattering of the carriers, and the performance of the FET declines. Also, the shallow source and drain regions cause an increase of parasitic resistance, further hampering the performance. Strained silicon technology enhances carrier mobility in both n-channel and p-channel silicon devices, and thus improves device speed and performance. A relatively simple change in starting materials allows less aggressive scaling of the transistor's gate length and oxide thickness. The increased performance is achieved through higher carrier mobility and reduced source/drain resistance.

FIG. 1 comprises a diagram 100 illustrating the effect of global strain on performance as a function of the channel length L, and a diagram 102 illustrating the effect of local strain on the performance as a function of the channel length L. These diagrams suggest that, for shorter transistor gate lengths, the benefit of global strain decreases, whereas that of local strain increases (Source: Interuniversity Microelectronics Centre (IMEC)).

There are two basic approaches to introducing strain into the transistor's channel: a global approach and a local approach. Bi-axial global strain (also referred to as: substrate-induced strain) is created over the whole wafer. Uni-axial local strain is realized locally, in the transistor's channel.

A first example of uni-axial strain technologies use compressive nitride and tensile nitride layers, deposited over the gates of p-channel FET and n-channel FET devices, respectively. This uniaxial type of strain is optimized to exert strain primarily in the direction along the channel. Because these liners also function as etch stops for the contact etch, this approach, when used on both transistors, is called a dual etch-stop liner (dESL).

A second example of a uni-axial strain technology is called stress memorization. This technology is similar to the liner technique discussed above, but the liner films are sacrificial. Stress is memorized into the device by depositing a film over the gate or source/drain region, performing the dopant activation anneal, and then removing the film. This technique is more complex, and has mostly involved the use of nitride or oxide films to memorize tensile strain in n-channel FETs. A key issue with stress memorization is achieving the desired nMOS performance enhancement without degrading pMOS performance.

A third example of a uni-axial stress technology involves etching out the source/drain area and replacing it with a lattice-mismatched material such as epitaxial SiGe in p-channel FETs and epitaxial SiC in n-channel FETs. Because of the epitaxial deposition technique, the germanium or carbon atoms replace silicon atoms in the lattice (rather than forming the compound SiGe or SiC). Germanium atoms are slightly larger than the lattice constant of silicon, as a result of which SiGe on silicon exerts compressive strain on the silicon channel. Carbon has a much smaller lattice constant, as a result of which silicon containing even a small amount of carbon exerts significant tensile stress on the channel.

An example of a bi-axial stress technology for fully strained silicon-on-insulator (SOI) wafers, as well as for strained silicon on SiGe on insulator (sGOI) wafers, uses the building in of strain into the entire active area of the device. For strained silicon grown on a relaxed SiGe (20%) layer, a 1% silicon lattice deformation results in bi-axial stress. Mobility enhancement is primarily for the nMOS device, though with higher germanium concentration, pMOS improvements are possible.

For more details, please see, e.g., "Strained Silicon: Essential for 45 nm", Laura Peters, Semiconductor International, Mar. 1, 2007; "A 90 nm High Volume Manufacturing Logic Technology Featuring Novel 45 nm Gate Length Strained Silicon CMOS Transistors", T. Ghani et al., Proc. IEDM Conf., 2003, pp. 978-980; and "Key Differences For Process-induced Uniaxial vs. Substrate-induced Biaxial Stressed Si and Ge Channel MOSFETs", S. E. Thompson et al., Proc. IEDM Conf., 2004, pp. 221-224.

Examples of the global approach are disclosed in, e.g., US patent application publication US 20050020094, herein incorporated by reference. Another example is disclosed in Japanese patent abstract publication 2007-250664, which addresses improving performance of a transistor. According to the latter publication, the semiconductor device is provided with a semiconductor chip on which the transistor is formed, first mold resin for resin-sealing a surface-side of the semiconductor chip, and second mold resin for resin-sealing a rear-side of the semiconductor chip. A thermal expansion coefficient of the first mold resin differs from that of the second mold resin. The whole semiconductor chip is physically bent by a difference of contraction forces when the first and second mold resins are cooled. Distortion is introduced into a channel region of the semiconductor chip, thus improving performance.

Examples of the local approach are disclosed in, e.g., US patent application publications US 20070108532 and US 20060160314, both incorporated herein by reference.

SUMMARY OF THE INVENTION

The inventors reason as follows in order to implement a sensor in semiconductor technology, based on having an environmental parameter inducing strain in a semiconductor component. Global stress can be applied to the substrate of an integrated circuit (IC) by means of, e.g., coating the IC, or only some areas thereof, with a layer (e.g., a polymer film). The layer has one or more dimensions that characterize its length, surface area, or volume. The material of the layer is chosen such that the change of the material's geometry depends on a value of a parameter indicative of the environment of the sensor.

For example, the material of the layer has a value of the coefficient of thermal expansion (CTE) different from that of the IC's substrate itself. The difference between the CTE values of the substrate and the layer causes a temperature-dependent stress that affects the mobility of the charge carriers in the devices of the IC. In turn, these mobility changes can be considered as representative of the temperature and, therefore, this phenomenon can be exploited to create a temperature sensor. Localization of these layers in certain areas (i.e., transistors) opens up the way to miniaturize temperature sensors. Another method of fabricating a temperature sensor is using polymer films (with high CTE value) embedded in the IC. If the layers are placed/localized at the specific areas, miniaturization of embedded temperature sensors is brought back to the dimension of a single transistor.

The invention uses a difference in expansion or contraction values to generate strain in an electronic device manufactured in, e.g., a photolithographic technology such as used for manufacturing ICs. The variation in IC performance due to an environmental parameter, e.g., temperature, can be used in order to implement a sensor device.

Global strain should be used with care, since residual stress of a polymer film is generally generated due to the discrepancy between the expansion of the film and the expansion of the substrate. Stress is a critical factor in packaging. If the stress exceeds the mechanical strength of the films/substrate, the materials will develop pinholes and cracks, which cause failure of the device.

Accordingly, the invention relates to a device comprising a sensor for sensing a value of a physical parameter indicative of an environment of the sensor. The sensor comprises an integrated electronic circuit that includes a functional component, e.g., a transistor or a diode. The sensor comprises means for affecting a magnitude of a stress in a material of the circuit, e.g., the substrate, in dependence on the value of the physical parameter. The means comprises a layer structurally coupled with the circuit and having a first coefficient of expansion with a first dependence on the physical parameter. A second coefficient of expansion of the material has a second dependence on the physical parameter. The second dependence can be negligible or practically zero in certain embodiments of the invention. The first dependence is different from the second dependence. The stress, occurring as a result of the layer being coupled with the substrate and of the difference in dependencies, determines an electrical property of the functional component. The electronic circuit is operative to generate an output signal representative of the electrical property.

Therefore, the layer induces a stress in the functional component as a result of being exposed to the environment. In turn, the stress affects the electric behavior of the component, and the circuit generates an output signal indicative of this behavior. Thus, the output signal can be interpreted as being representative of the environment.

In an embodiment, the functional component is covered by the layer, and most other components of the circuit are not. The output signal thus is indicative of the state of the environment at the location of the functional component. Multiple such functional components can be provided at different locations on the substrate of the integrated circuit. Each of these components can be covered by separate disjoint pieces of the layer. If the physical parameter includes the temperature, the temperature can be sensed at different locations of the substrate. In another embodiment, a respective one of the multiple functional components is covered by a respective piece of a respective layer. Different layers are susceptible to different physical parameters. Different physical parameters cause different amounts of stress at different functional components, For example, one layer is sensitive to temperature, and another layer is sensitive to humidity. Accordingly, the circuit can be configured to supply different output signals representative of different physical parameters. This configuration enables to combine a variety of sensors within a single circuit.

In another embodiment, the electronic circuit is substantially covered by the layer. This may facilitate the manufacturing of the sensor. Also, if multiple functional components are involved and covered by the same layer, their combined effect can be used to generate an output signal that more accurately represents the value of the physical parameter, e.g., by means of taking the average of the signals generated by the functional components.

The physical parameter is one of, e.g., a temperature; acidity; a characteristic of incident light; humidity; and a concentration of a chemical substance. Examples of suitable materials and literature references for these layers are discussed further below.

The device of the invention can be accommodated in a transponder. For example, the transponder comprises an RFID tag. This approach enables remote sensing of the physical parameter.

In a further embodiment, the device of the invention comprises further electronic circuitry. The sensor is configured for, e.g., supplying a signal to the further electronic circuitry in dependence on the value sensed. The further circuitry is configured for, e.g., processing the signal received. The processing may include forwarding the information, contained in the signal received from the sensor, to an external destination, e.g., via an RF-link or via a wired link. The processing may include controlling operation of the further electronic circuitry in dependence on the value sensed. For example, assume that performance of the further electronic circuitry depends on the circuitry's temperature, and that the sensor includes a temperature sensor of the kind set forth above. The sensor can now be used to stabilize performance of the further circuitry by means of controlling the supply voltage to the further circuitry in dependence on the value of the temperature sensed. As another example, the further circuitry is configured to transmit a signal if the temperature as sensed exceeds, or drops below, a predetermined threshold.

The coupling of the sensor layer with the substrate could be implemented as a direct coupling or as an indirect coupling. In a direct coupling, the layer is formed on the silicon of the substrate. In an indirect coupling, one or more intermediate layers are present between the sensor's layer of the material with the first coefficient of expansion and the substrate. The intermediate layers serve to, e.g., isolate the substrate from the sensor layer so as to prevent that the environmental parameter chemically affects the circuitry, or to expose the substrate to a reduced stress. For example, in the embodiment of the invention with a sensor for sensing moisture in the ambient air or an acid in the ambient fluid, moisture or acid could damage the circuitry when in direct contact with the substrate. The intermediate layer(s) may also serve to combine the sensor layer with the substrate to obtain a higher aggregate coherence between the sensor layer and the substrate than in the absence of the intermediate layer(s). The intermediate layer(s) may also serve to overcome the problem of undesirable chemical or physical interaction at the interface between the sensor layer and the substrate if these were in direct contact with each other.

The intermediate layers transmit to the substrate the stress induced in the sensor layer. The intermediate layers may absorb some of the stress. Thickness, chemical and physical constitution of the sensor layer and of the intermediate layers, and their mutual coherence, among others, determine the conversion of the environmental parameter to stress at the functional component.

For completeness, reference is made to the following publications.

US patent application publication US 20080026503, herein incorporated by reference, discloses an integrated circuit that comprises a monitored region defined by three or more edges. The integrated circuit comprises at least two temperature sensors for each of the three or more edges. The temperatures sensors are arranged along the three or more edges such that each edge has substantially the same arrangement of temperature sensors. Thermal management of the integrated circuit may be accomplished by modifying functional aspects of the integrated circuit in response to measurements provided by the temperature sensors. Incorporation of temperature sensors in integrated circuits is described in, for example, J. Altet et al., Thermal Testing of Integrated Circuits, Springer, 2002. The temperature sensors in US 20080026503 may include, as an example, semiconductor diodes comprising forward-biased p-n junctions that change current flow in response to temperature. Additionally or alternatively, the temperature sensors may comprise resistor elements that change electrical resistance in response to temperature. Moreover, the temperature sensors may comprise circuits with rates of signal propagation that are a function of temperature. The temperature sensors may also comprise oscillator circuits whose frequencies are a function of temperature. This publication neither teaches nor suggests implementing a sensor using a difference in expansion values in order to create a distortion as an indication of an environmental parameter to be measured in operational use of the sensor.

International publication WO2007/091299 discloses a method for heating a TFT (thin-film transistor) substrate. The method comprises forming a resistive film pattern on one face of the TFT substrate, applying a voltage to the resistive film pattern to cause an electric current to flow thereby to establish a heat source, and heating the TFT substrate directly with the heat source, so that the temperature distribution of the substrate is homogenized to enhance the heating efficiency of the substrate. Also provided is a temperature measuring method for a TFT substrate. The measuring method comprises forming a resistive film pattern on one face of the TFT substrate, applying a voltage to the resistive film pattern to cause an electric current to flow, detecting the applied voltage and the electric current to flow through the resistive film pattern, and determining the temperature of the resistive film pattern by calculations from the applied voltage and the detected current on the basis of a relation to a temperature coefficient expressing a relation of the temperature change to the change in the electric resistance of the resistive film pattern, so that the temperature of the resistive film pattern determined is measured as the temperature of the TFT substrate. Thus, the temperature can be measured without requiring a temperature sensor for detecting the temperature of the substrate. This publication neither teaches nor suggests implementing a sensor using a difference in expansion values in order to create stress in a transistor as an indication of the parameter to be measured.

Japanese patent abstract publication 11-195792 addresses the problem of providing a semiconductor type detecting element, which uses a silicon carbide thin film, composed of an organic silicon material as a detecting material and which can be suitably used for a semiconductor type strain detecting element having a high gauge factor and high sensitivity. This publication also addresses the problems of providing a semiconductor type temperature detecting element, which stably indicates a good resistance—temperature characteristic, etc., and a method for manufacturing the detecting element. The problems are stated to be solved by providing a semiconductor type detecting element, constituted in such a way that a silicon carbide thin film composed of an organic silicon material is formed on an insulating substrate, and fluctuations in the electrical resistance value of the thin film are detected. The thin film contains oxygen atoms at a concentration of 5-30 mol %. In a method for manufacturing the semiconductor type detecting element, the silicon carbide thin film composed of the organic silicon material is heat-treated in a diluted oxygen atmosphere after the thin film has been formed on the insulating substrate. This publication teaches using the electrical resistance of the thin film as a measure for distortion or for temperature. This publication neither teaches nor suggests implementing a sensor using a difference in expansion values in order to create stress in a transistor as an indication of the parameter to be measured in operational use.

US patent application publication 20060269693, incorporated herein by reference, teaches that deposition process and treatment conditions can be tailored to deposit a compressive stressed material on the substrate or to treat a material during or after deposition to increase its compressive stress value. Stressing the atomic lattice of a deposited material improves the electrical properties of the material itself, or of underlying or overlying material that is strained by the force applied by a stressed deposited material. A silicon nitride stressed material having higher compressive stress values can be obtained by increasing the RF bombardment to achieve higher film density by having more Si—N bonds in the deposited material and reducing the density of Si—H and N—H bonds. Higher deposition temperatures and radio frequency (RF) power improved the compressive stress levels of the deposited film. In addition, higher compressive stresses levels were obtained in the deposited material at higher kinetic energy levels of plasma species. It is believed that bombardment of energetic plasma species, such as plasma ions and neutrals, generates compressive stresses in the deposited material because film density increases. The process gas used to deposit compressive stressed silicon nitride includes the silicon-containing and nitrogen-containing gases. Depositing a nitride layer at higher temperatures improves the compressible stress levels of the deposited nitride film. The deposition temperatures of the substrate lie in the range of 300° C.-600° C. This publication neither teaches nor suggests implementing a sensor using a difference in expansion values in order to create stress in a transistor as an indication of the parameter to be measured.

U.S. Pat. No. 6,480,730 discloses an implantable sensor system for monitoring the concentration of a chemical analyte of interest. The system is used for medical applications, such as implanted sensor packages for long-term monitoring of physiological blood or tissue analytes, like glucose for control of diabetes. The analyte concentration is transduced by a circuit, the characteristics (e.g., resonant frequency) of which are set by at least one circuit component (e.g., capacitance, inductance), whose value can be varied by the interaction between an analyte-sensitive material and the analyte. For example, changing the distance between the plates with a glucose-swellable polymer can vary the capacitance of a parallel-plate capacitor. As the electrical characteristics of the circuit vary in response to changes in the concentration of the analyte, an external interrogator transmits a signal transdermally to the transducer, and the concentration of the analyte is determined from the response of the transducer to that signal. FIG. 8 is an embodiment of the present invention that relies on inductance change rather than capacitance change and utilizes the same fabrication techniques as in FIG. 7. In this embodiment, a spiral thin film metal inductor 140 is patterned on the top electrode 142. A hole 144 is patterned in the top electrode 142, and a pedestal 146 made of a magnetic material is patterned on the insulating nitride layer 148. The insulating layer 148 overlays the flexible membrane 150 and its support layer 152. When the membrane 150 moves in response to dimensional changes of the analyte-sensitive polymer (not shown), the pedestal 146 patterned on top of the moving membrane moves through the inductor coil 140, causing an inductance change. The change in inductance is then detected by an external telemetry device, as described previously. This publication neither teaches nor suggests implementing a sensor using a difference in expansion values in order to create a stress in a transistor as an indication of an environmental parameter to be measured in operational use of the sensor.

Published European patent application 1 191 332 discloses a moisture sensor consisting of a sensitive layer, and a field effect transistor using the sensitive layer as a component of its gate. The sensitive layer has a work function (in German "Austrittsarbeit") that depends on absorption of a chemical substance or on chemical surface reaction due to the substance. The expression "work function" is well known in the art and is defined as the minimum amount of energy (in electro volts) necessary to remove an electron from an electrically neutral piece of material, i.e., the energy needed to move an electron from the Fermi level into vacuum. The chance in work function is represented by a voltage that is coupled capacitively to the channel of a FET. As a result, changes occur in the electrical behavior of the FET that can be interpreted as indicative of the amount of absorption taken place in the sensitive layer. This publication neither teaches nor suggests implementing a sensor using a difference in expansion values in order to create a stress in a transistor as an indication of an environmental parameter to be measured in operational use of the sensor.

BRIEF DESCRIPTION OF THE DRAWINGS

The invention is explained in further detail, by way of example and with reference to the accompanying drawing, wherein.

Throughout the Figures, similar or corresponding features are indicated by same reference numerals.

DETAILED DESCRIPTION OF THE EMBODIMENTS

The invention relates to a sensor implemented in semiconductor technology, wherein a behavior of the sensor's electronic circuitry is affected by stress. The stress is induced by a film covering the circuitry or only part thereof. The stress is caused by the film's material, whose dimensions depend on a value of a parameter that characterizes the environment of the sensor. This dependence is different from the dependence of the circuitry's substrate on the same parameter.

The sensor can be pre-stressed intentionally during manufacturing, so as to choose the optimal working point for the intended use of the sensor. In other words, the film or layer is applied in such a manner, that the change in stress during operational use of the sensor is largest around a value of the environmental parameter that lies roughly in the middle of the range of values that are going to be monitored with the sensor. Thus, the sensitivity of the sensor can be optimized for the intended range.

This invention provides a method to fabricate a miniature sensor integrated either on the silicon or in the package. Consider the example of a sensor for sensing temperature. The stress in the film due to the mismatch in CTE causes a mobility change in the affected area. A change in temperature causes a change in thermal expansion, subsequently a change in stress and a change in charge carrier mobility. Therefore, transistor performance changes and can be used as an indicator of the temperature. The usage of the effect of strain on carrier mobility is discussed, which can be used in a temperature sensor. Various configurations are proposed.

Figure 1:
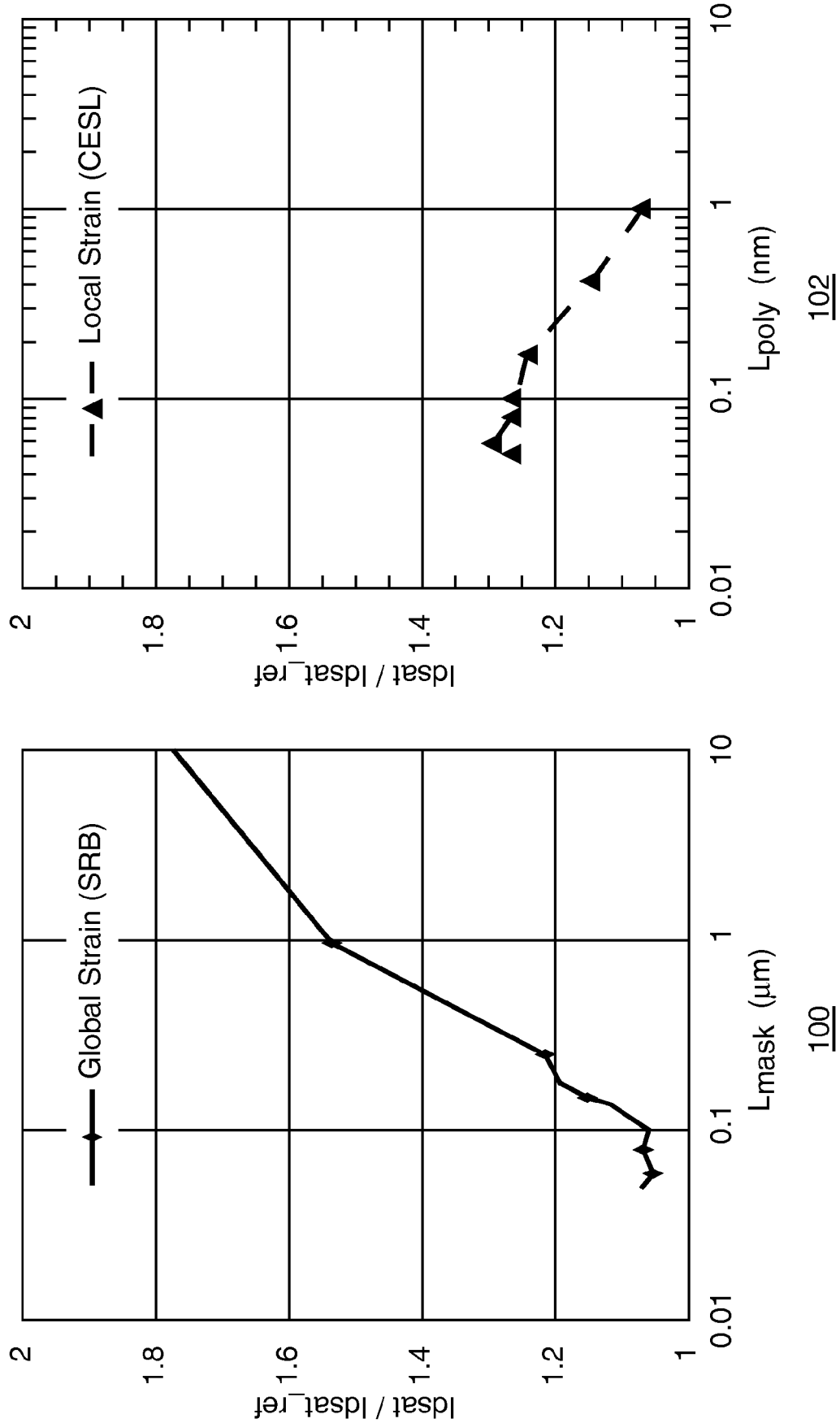
FIG. 1 has diagrams illustrating the effect of global strain and local strain on performance as a function of the channel length of a FET.
Figure 2:
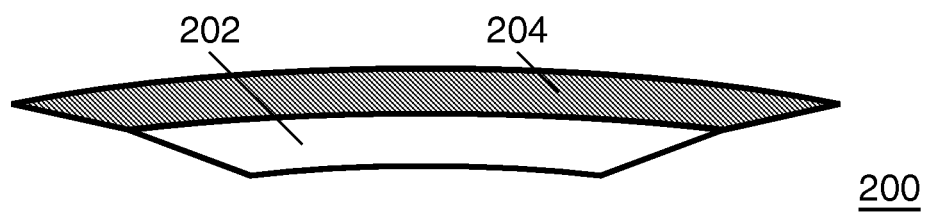
FIGS. 2 and 3 are diagrams illustrating the use of global stress in a sensor according to the invention.

FIG. 2 is a diagram illustrating a first configuration 200 that uses global strain by encapsulating an IC 202 in a high CTE-film 204 (i.e. encapsulating the package). The global strain exerts its force on the components, e.g., transistors and diodes, embedded in the silicon or the global strain exerts its force on organic circuitry embedded in the package. The entire IC 202 is strained (globally) by a high-stress layer 204, e.g. in the package. All components present (both NMOS and PMOS) will be affected by this. Especially for thin silicon substrates the effect will be large. If reference transistors are placed at different locations in IC 202, the increase or decrease in mobility (and performance) can be measured and directly related to a temperature change. In the case of plain CMOS, these reference transistors can be used to sense the temperature and to correct for its mobility change (e.g., keeping performance constant by adjusting the supply voltage).

Alternatively, one can use global strain by encapsulating the package in high-CTE films, wherein the global strain exerts its force on organic circuitry embedded in the package. In this case, simple organic transistors in the package serve as temperature sensing devices.

If an organic transistor is used, the circuitry is fabricated in organic material (e.g., polymers) and no silicon is needed or used. The transistor's channel consists of polymeric material, which is sensitive to external stimuli (e.g., temperature). The mobility in the channel is extremely sensitive to these stimuli. Therefore, organic circuitry on its own as such can serve as a sensor.

Figure 3:
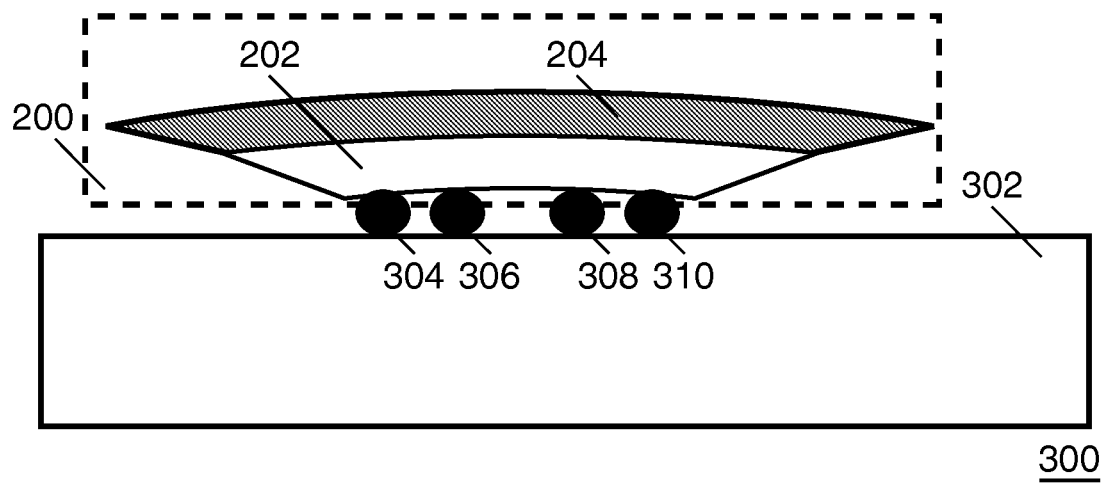

FIG. 3 is a diagram illustrating a second configuration 300. Device 200 of FIG. 2 is now bonded on top of a second IC 302, using bonding pads 304, 306, 308 and 310. In configuration 300, the stress is only exerted on IC 202. In an embodiment of configuration 300, the combination of configuration 200 with IC 302 forms a device according to the invention. Configuration 200 serves as a sensor, and IC 302 serves to process or route the signal received from configuration 200 via one or more pads 304-310 and, optionally, to drive the electronic circuit of configuration 200. Configuration 300 supports a modular approach, wherein the same type of sensing configuration 200 can be used with different types or designs of IC 302. For example, IC 302 comprises analog, or both analog and digital circuitry, whereas sensor IC 202 is implemented in CMOS only. Accordingly, if ICs 202 and 302 are fabricated in incompatible technologies, configuration 300 provides a feasible option. As another example, sensor IC 202 can be used in an instance of configuration 300 wherein IC 302 is a data processor IC, and in another instance of configuration 300 wherein IC 302 is a memory IC, and in yet another instance, IC 302 is a driver IC. Accordingly, the hybrid character of configuration 300 supports a standardized sensor IC 202 for use with a variety of ICs 302.

Figure 4:
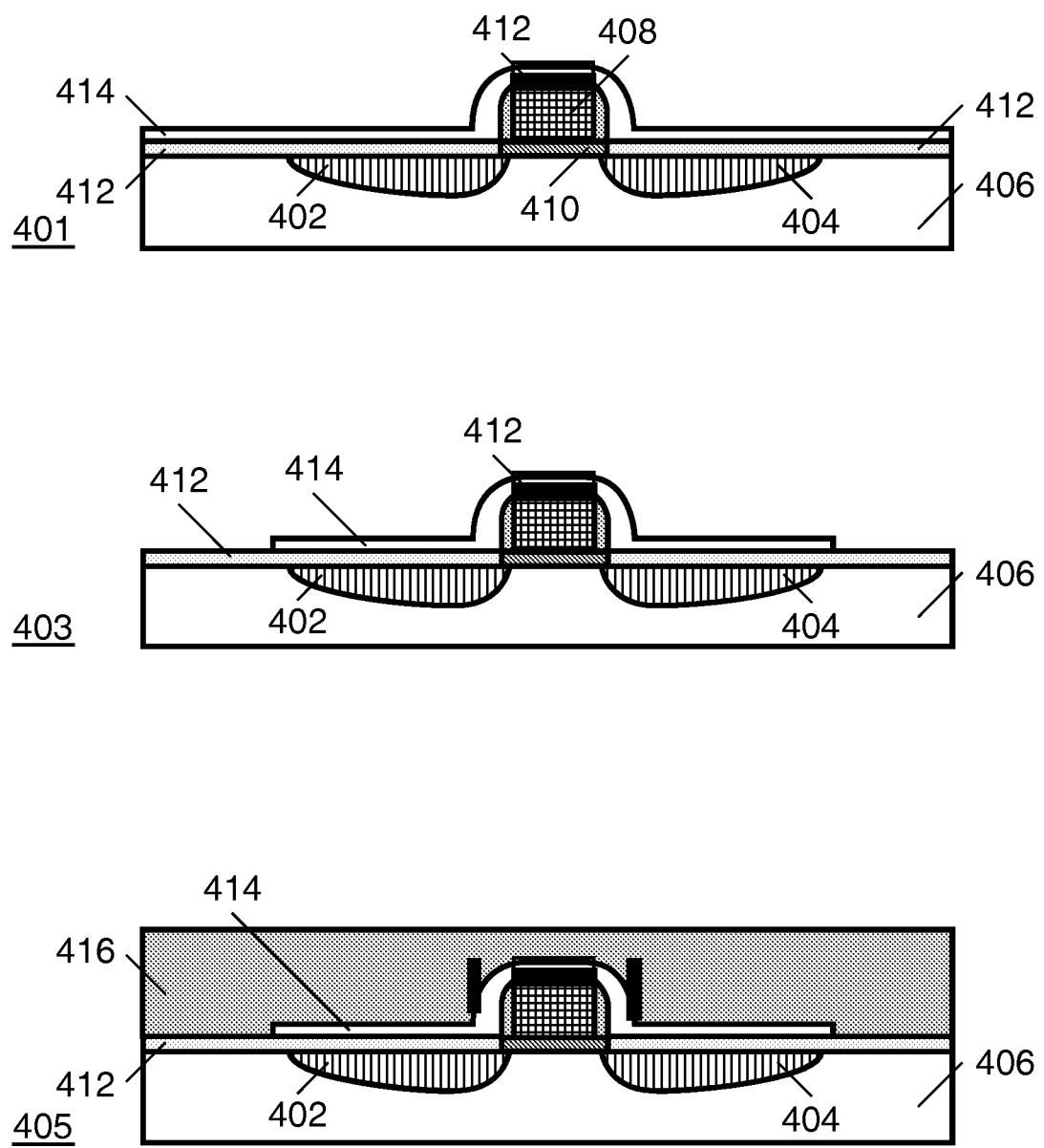
FIGS. 4, 5 and 6 give the results of process steps illustrating the manufacturing of a sensor in the invention.
Figure 5:
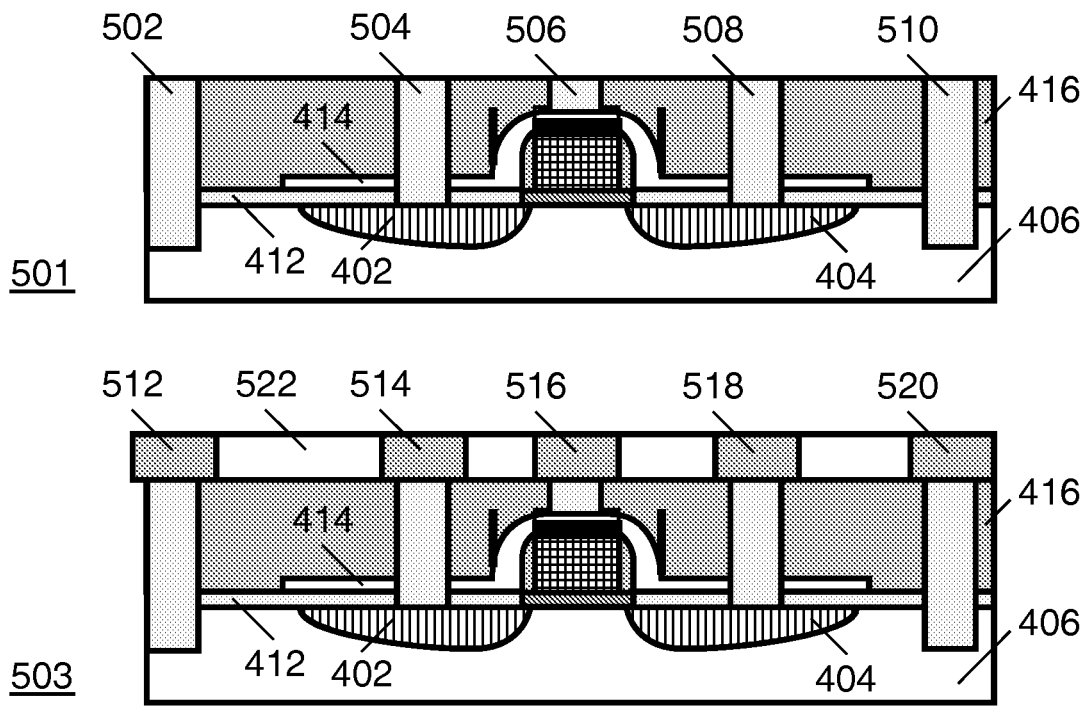

FIGS. 4 and 5 illustrate a third configuration of a sensor in the invention by way of a process, wherein a tensile strain polymer film is positioned locally to cover a certain transistor structure, e.g., a FET. The process uses steps known in the art of forming integrated circuitry.

Figure 7:
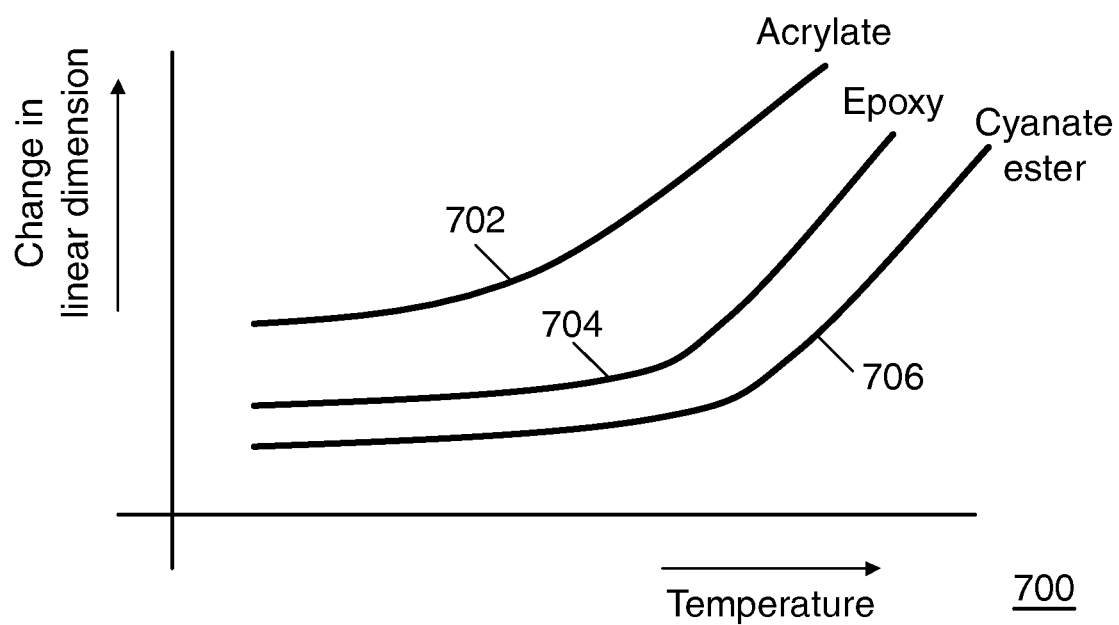
FIG. 7 is a diagram illustrating CTE behavior of some materials.

Referring to FIG. 4, a structure 401 is obtained after a process step, wherein a drain region 402 and a source region 404 have been formed in a well 406 that itself is formed in a semiconductor substrate (not shown), e.g., a silicon substrate. Structure 401 further has a gate 408 made of, e.g., polysilicon, located over a dielectric layer 410 made of, e.g., silicon oxide. The region in well 406 underneath dielectric 410 is going to form the FET's channel. A silicide layer 412 has been formed to cover drain region 402 gate 408 and source region 404. A layer 414 is formed over the area of the substrate that accommodates the FET. Layer 414 is formed of a material that is going to induce a stress in the channel as a result of an interaction between the material of layer 414 and the environment, wherein the sensor is going to be used. Layer 414 is made of, e.g., a polymer with a suitable CTE if the FET is going to be operating in a temperature sensor. Such a material is, e.g., polyimide, epoxy, etc. Typically, organic materials have relatively large values for their CTE, typically larger than 20 ppm/° C. The table below gives the relevant information about some different materials and their corresponding CTE values. FIG. 7 gives a diagram 700 illustrating the relative behavior of the CTE of these materials over a temperature range. Curves 702, 704 and 706 indicate the values of the CTE of Acrylate, Epoxy and Cyanate ester, respectively. Acrylate would be a suitable material if its glass transition temperature $T_g$ were not too low to survive further processing. As known, the glass transition temperature is the temperature at which an amorphous material such as a polymer or glass, becomes soft when heated.

|  | Acrylate | Epoxy | Cyanate ester |
| --- | --- | --- | --- |
| Tg. (° C.) | <0 | 146 | 175 |
| CTE (ppm/° C.) | 86 | 24 | 18 |

Polyimide has a CTE of about 13, and is much more temperature-resistant. Cyanate ester and epoxy could also be used owing to their favorable temperature resistance. Carbon fibre and Kevlar have a negative CTE, i.e., the material contracts upon being heated and expands upon being cooled.

If the transistor is going to be used in a humidity sensor, layer 414 is made of, e.g., a polymer such as polyamide, polyvinyl, pyrrolidone, polyimide and/or ethylcellulose, optionally doped with cobalt chloride and/or with copper chloride. If the transistor is going to be used in an acidity sensor, layer 414 is made of, e.g., a hydrogel. For more background information, please see, e.g., "Superabsorbency, pH-Sensitivity and Swelling Kinetics of Partially Hydrolized Chitosan-g-poly (Acrylamide) Hydrogels", A. Pourjavadi et al., Turk J. Chem 30 (2006), pp. 595-608).

A structure 403 is obtained after a process step, wherein layer 414 has been patterned by selectively removing parts of layer 414 in a photolithographic step, the remaining part covering at least the major portion of the area, wherein the transistor structure has been formed.

A structure 405 is obtained after a process step, wherein a pre-metal dielectric stack 416 (PMD stack or oxide stack) has been formed over the substrate.

Referring to FIG. 5, a structure 501 is obtained after a process step to form metal contacts 502, 504, 506, 508 and 510 using, e.g., wolfram. Contacts 504, 506 and 508 serve to provide electrical connection with drain region 402, gate 408 and source region 404, respectively. Contacts 502 and 510 serve to provide electrical connection to well 406.

A structure 503 is obtained after a process step wherein metal tracks 512, 514, 516, 518 and 520 are formed to electrically connect contacts 502-510 to other components of the circuitry in the IC. A dielectric layer 522 is formed to electrically isolate tracks 512-520.

Structure 503 can be used in a temperature sensor with a suitable material for layer 414 so as to induce a temperature-dependent stress in the channel of the FET. In operational use, it is assumed that the temperature of the environment of the sensor equals the temperature of layer 414 at least substantially. Equilibrium is achieved when there no transport of heat between layer 414 and the environment of layer 414. Layers 412, 416 and 522, and contacts 502-520 are all in thermal contact with layer 414. As a result, the parameters of these features that determine heat conduction come into play when assessing the rate at which layer 414 follows changes in the ambient temperature. For convenience, the packaging layers and bonding features are not shown.

In a temperature sensor, layer 414 does not need access to the environment of the sensor via a fluid such as a gas or a liquid. In a humidity sensor or a pH sensor, layer 414 needs to absorb or emit a chemical substance and therefore needs access to the environment. This is discussed with reference to FIG. 6.

Figure 6:
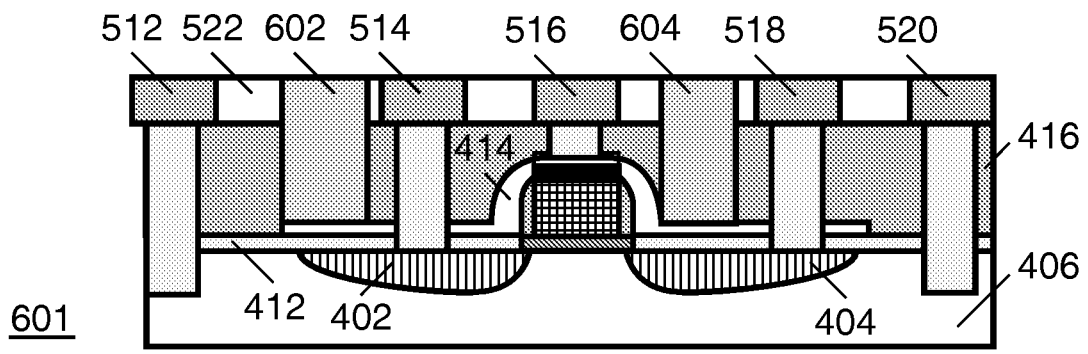

FIG. 6 is a diagram of a structure 601, wherein one or more features 602 and 604 are provided so as to give the environment access to layer 414. Features 602 and 604 are shown in cross section and may in reality be formed with a ring-shaped feature so as to maximize the contact surface between layer 414 and the environment. Features 602 and 604 may be formed as openings so as to receive airborne or fluid-transported particles. Alternatively, features 602 and 604 are made from a material that facilitates transport of these particles towards layer 414. Alternatively, features 602 and 604 are formed from a material that chemically or physically reacts to the presence of these particles, thereby generating heat that is transported to temperature-sensitive layer 414. With the humidity or acid having to reach layer 414, porous materials and so-called low-k dielectric materials can be used at the PMD level and metal level, such as porous silicon dioxide, porous carbon-doped silicon dioxide, and organic materials such as polymers, so as to allow the moisture or other fluid particles to penetrate. However, such localized sensing for particles may not be preferred, so that a moisture sensor or pH sensor is preferably implemented using configurations 200 and 300 that use a global strain approach.

The invention has been illustrated above, by way of example, and with reference to a temperature sensor implementation. For suitable materials see, e.g., J. S. Kim et al., "Biaxial Stress Analysis in Laminated Polymer Films on Silicon Substrates for MCM-D Application", Journal of the Korean Physical Society, Vol. 33, November 1998, pp. s142-s146; "Thermo-Mechanical Stresses in Laminated Polymer Films on Silicon Substrates", Jin S. Kim et al., International Conference on Multichip Modules and High Density Packaging, 1998, pp. 449-453.

As mentioned already, the concept of the invention can similarly be applied to sensing physical parameters other than temperature, using a suitable material for the film.

For suitable materials for implementing a pH-sensor, reference is made to

"Swelling behavior and release properties of pH-sensitive hydrogels based on methacrylic derivatives", Tahar Bartil et al., Acta Pharm. 57, 2007, pp. 301-314.

For suitable materials for implementing a humidity sensor, reference is made to "Swelling—Deswelling Kinetics of Ionic Poly(acrylamide) Hydrogels and Cryogels", Deniz Ceylan et al., Journal of Applied Polymer Science, Vol. 99, 2006, pp. 319-325, and to published European application 1 191 332. Note that the humidity sensor in an embodiment of the invention is based on the idea of integrated humidity sensing or moisture sensing by changes in the stress-induced transistor performance due to the volume expansion of at least one polymer coating, in particular polymer film or polymer layer or polymer substrate, on top. The polymer can be an organic polymer, such as polyamide, polyvinyl, pyrrolidone, polyimide and/or ethylcellulose, possibly contaminated or doped with cobalt chloride and/or with copper chloride. According to the present invention, at least one polymer film or polymer layer or polymer substrate is deposited on at least one transistor. The polymer expands when exposed to humidity, creating a stress in the channel region of the transistor. The mechanical stress modifies the charge carrier mobility and resistance of the transistor, which leads to a detectable change in properties, which in turn can be used as a measure of humidity. In particular, a single transistor can be used as a sensor.

For materials useable for implementing a sensor for a variety of chemical agents, see, e.g., U.S. Pat. No. 5,015,843 (corresponding to WO1991/12626), incorporated herein by reference. This publication discloses a chemical sensor for detecting the presence of chemical species in solution based upon polymer swelling in response to the chemical species.

For materials suitable for implementing a magnetic field sensor, see, e.g., "Direct observation of discrete and reversible shape transition in magnetic field sensitive polymer gels", M. Zrínyi, L. Barsi, A. Büki, at <http://www.kfki.hu/about.cheminfo/hun/olvaso/zrinyi/polymgel.html>. See also Polymer Gels Netw. 5(5):415-27 (1997); Ach-Models Chem 134 (2-3):155-67 (1997); Magy Kem Foly 103(9):401-10 (1997); M. Zrinyi, "Magnetic-field-sensitive gels," Trends in Polymer Science, 1997, Vol. 5, No. 9, pp. 280-285; Zrinyi et el., "Magnetic Field Sensitive Polymeric Actuators," in Y. Osada and D. E. Rossi (ed.), Polymer Sensors and Actuators, Heidelberg, Springer-Verlag Berlin, 1999, pp. 385-408; Zrinyi et el., "Comparative Studies Of Electric—And Magnetic Field Sensitive Polymer Gels Smart Structures And Materials," in Yoseph Bar Cohen (ed.), Electroactive Polymer Actuators and Devices, SPIE, 1999/3669, pp. 406-413; Zrinyi et el., "Electric and Magnetic Field—Sensitive Smart Polymer Gels," in Y. Osada and A. Khokhlov (ed.), Polymer Gels and Networks, New York, Marcel Dekker, Inc., 2001, pp. 309-355, M. Zrinyi, "Intelligent Polymer Gels Controlled by Magnetic Fields," Colloid & Polymer Science, Vol. 27 (2), 2000, pp. 98-103; Xulu et el., "Preparation and Responsive Properties Magnetically Soft Poly(N-isopropylacrilamide) Gels," Macromolecules, 33(5), 2000, pp. 1716-1719.

For hydrogels whose characteristics are altered under influence of, e.g., temperature, oil/water ratio, pH level, electromagnetic field, see, e.g., U.S. Pat. No. 7,304,098, incorporated herein by reference.

The invention provides a way to measure variations in a current flowing in a functional component of an electronic circuit (e.g., a transistor, a diode, a resistance, etc.) that are induced by a compressive or tensile stress generated by the special packaging of the IC. This technique is quite generic and can be applied to sensors where such stress is created. Stress and strain sensors are examples, but this could also be extended to gas/liquid sensors if appropriate materials are available. The variations in current through a transistor are caused by changes in carrier mobility and, depending on the size of the device and the amount of stress, could change up to 200% in a silicon-based device. Similar effects exist in other semiconductor materials, such as Germanium and GaAs. Currents can be sensed in many ways. A simple CMOS implementation uses a Wheatstone bridge that determines a difference in currents through the sensing device and a reference device. The reference device has an electric behavior that is practically independent of the stress. The reference device comprises, e.g., a simple on-chip resistor made in poly-silicon, and a differential current amplifier. This allows to measure minute variations in currents and thus, for this invention, provides an analog signal that can be used to convert a magnitude of the environmental parameter, e.g., temperature, humidity, etc., into an electrical signal. The relationship between the environmental parameter, the induced stress and the modified current is to be known, in order to map the signal to the value of the environmental parameter. This signal can be used for data processing using, for instance, an analog-to-digital converter with appropriate resolution to move the signal to the digital domain. For more details on the current sensing circuitry suitable for such sensors, please see, e.g., "Low-Voltage Current-Sensing CMOS Interface Circuit for Piezo-Resistive Pressure Sensor", A. Thanachayanont et al., ETRI Journal, Vol. 29, No. 1, February 2007, pp. 70-78; "A Novel Built-in Current Sensor for IDDQ Testing of Deep Submicron CMOS ICs", S. P. Athan et al., 14th VLSI Test Symposium—1996, pp 114-123; "A Practical Built-In Current Sensor for IDDQ Testing", H. Kim et al., Paper 14.3, ITC International Test Conference, 2001, pp. 405-414; and "Current-Sensing Techniques for DC-DC Converters", H. P. Forghani-zadeh et al., Proc. 2002 Midwest Symposium on Circuits and Systems, pp. 577-580.

The invention claimed is:

1. A device comprising a sensor for sensing a value of a physical parameter indicative of an environment of the sensor, wherein:
   the sensor comprises an integrated electronic circuit that includes a functional component of the integrated electronic circuit;
   the sensor comprises means for affecting a magnitude of a global strain in a substrate of the integrated electronic circuit in dependence on the value of the physical parameter;
   the means comprises a layer structurally coupled with the integrated electronic circuit and having a first coefficient of expansion with a first dependence on the physical parameter;
   a second coefficient of expansion of the substrate has a second dependence on the physical parameter;
   the first dependence is different from the second dependence;
   the global strain determines an electrical property of the functional component of the integrated electronic circuit;
   the integrated electronic circuit is operative to generate an output signal representative of the electrical property; and
   the layer is operative to induce the global strain in the substrate the device further comprising:
   a pre-metal dielectric layer formed over the substrate, over the functional component of the integrated electronic circuit, and over the layer;
   metal contacts, formed on top of the pre-metal dielectric layer, which provide electrical connections to the functional component of the integrated electronic circuit; and one or more features through the pre-metal dielectric layer to the layer so as to give the environment access to the layer.

2. The device of claim 1, wherein the physical parameter is one of: a temperature; acidity; a characteristic of incident light; humidity; and a concentration of a chemical substance.

3. The device of claim 1, accommodated in a transponder.

4. The device of claim 3, wherein the transponder comprises an RFID tag.

5. The device of claim 1, comprising further electronic circuitry, wherein:
the sensor is configured for supplying a signal to the further electronic circuitry in dependence on the value sensed.

6. The device of claim 5, wherein the further circuitry is configured for processing the signal from the sensor.

7. The device of claim 6, wherein the processing comprises controlling operation of the further electronic circuitry in dependence on the value sensed.

8. The device of claim 1, wherein the one or more features comprises a ring-shaped feature to provide access to the layer.

9. The device of claim 1, wherein the functional component is a field effect transistor (FET) having a source, a drain, and a gate, wherein the layer is formed completely over the transistor, and wherein the one or more features access the layer above the source and drain of the transistor.

10. The device of claim 1, wherein the one or more features comprise one or more openings through the pre-metal dielectric layer to the layer so as to give airborne transported particles access to the layer.

11. The device of claim 1, wherein the one or more features comprise one or more openings through the pre-metal dielectric layer to the layer so as to give fluid transported particles access to the layer.

12. The device of claim 1, wherein the layer is a temperature-sensitive layer and wherein the one or more features are formed from a material that chemically or physically reacts to the presence of particles in the environment, thereby generating heat that is transported to the temperature-sensitive layer.

13. The device of claim 1, wherein the layer is structurally coupled with the integrated electronic device to pre-stress the global strain such that a change in the magnitude of the global strain in the substrate during operational use of the sensor is largest around a value of the physical parameter that lies roughly in the middle of the range of values that are going to be monitored with the sensor.

14. The device of claim 1, wherein the device is an integrated circuit device and wherein the layer encapsulates the integrated circuit device and wherein the layer induces global strain in the integrated circuit device.

15. A device comprising a sensor for sensing a value of a physical parameter indicative of an environment of the sensor, wherein:
the sensor comprises an integrated electronic circuit that includes a functional component of the integrated electronic circuit;
the sensor comprises means for affecting a magnitude of a global strain in a substrate of the integrated electronic circuit in dependence on the value of the physical parameter;
the means comprises a layer structurally coupled with the integrated electronic circuit and having a first coefficient of expansion with a first dependence on the physical parameter;
a second coefficient of expansion of the substrate has a second dependence on the physical parameter;
the first dependence is different from the second dependence;
the global strain determines an electrical property of the functional component of the integrated electronic circuit;
the integrated electronic circuit is operative to generate an output signal representative of the electrical property; and
the layer is operative to induce the global strain in the substrate;
wherein the layer is structurally coupled with the integrated electronic device to pre-stress the global strain such that a change in the magnitude of the global strain in the substrate during operational use of the sensor is largest around a value of the physical parameter that lies roughly in the middle of the range of values that are going to be monitored with the sensor.

16. A device comprising a sensor for sensing a value of a physical parameter indicative of an environment of the sensor, wherein:
the sensor comprises an integrated electronic circuit that includes a functional component of the integrated electronic circuit;
the sensor comprises means for affecting a magnitude of a global strain in a substrate of the integrated electronic circuit in dependence on the value of the physical parameter;
the means comprises a layer structurally coupled with the integrated electronic circuit and having a first coefficient of expansion with a first dependence on the physical parameter;
a second coefficient of expansion of the substrate has a second dependence on the physical parameter;
the first dependence is different from the second dependence;
the global strain determines an electrical property of the functional component of the integrated electronic circuit;
the integrated electronic circuit is operative to generate an output signal representative of the electrical property; and
the layer is operative to induce the global strain in the substrate;
wherein the device is an integrated circuit device and wherein the layer encapsulates the integrated circuit device and wherein the layer induces global strain in the integrated circuit device.

* * * * *